E. ELY.
Improvement in Fences.
No. 114,543.  Patented May 9, 1871.
2 Sheets--Sheet 1.
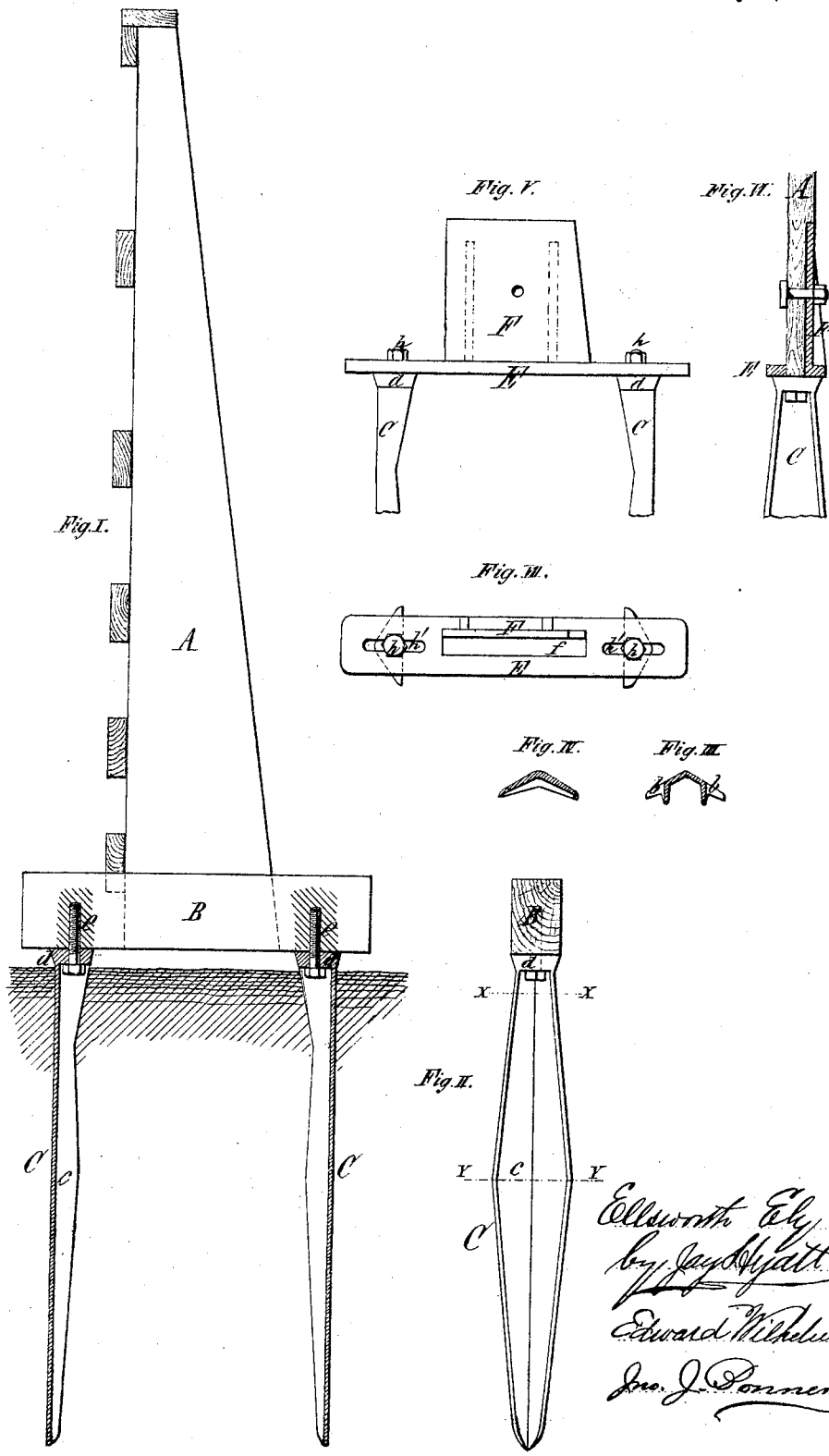

E. ELY.
Improvement in Fences.
No. 114,543.
2 Sheets--Sheet 2.
Patented May 9, 1871.
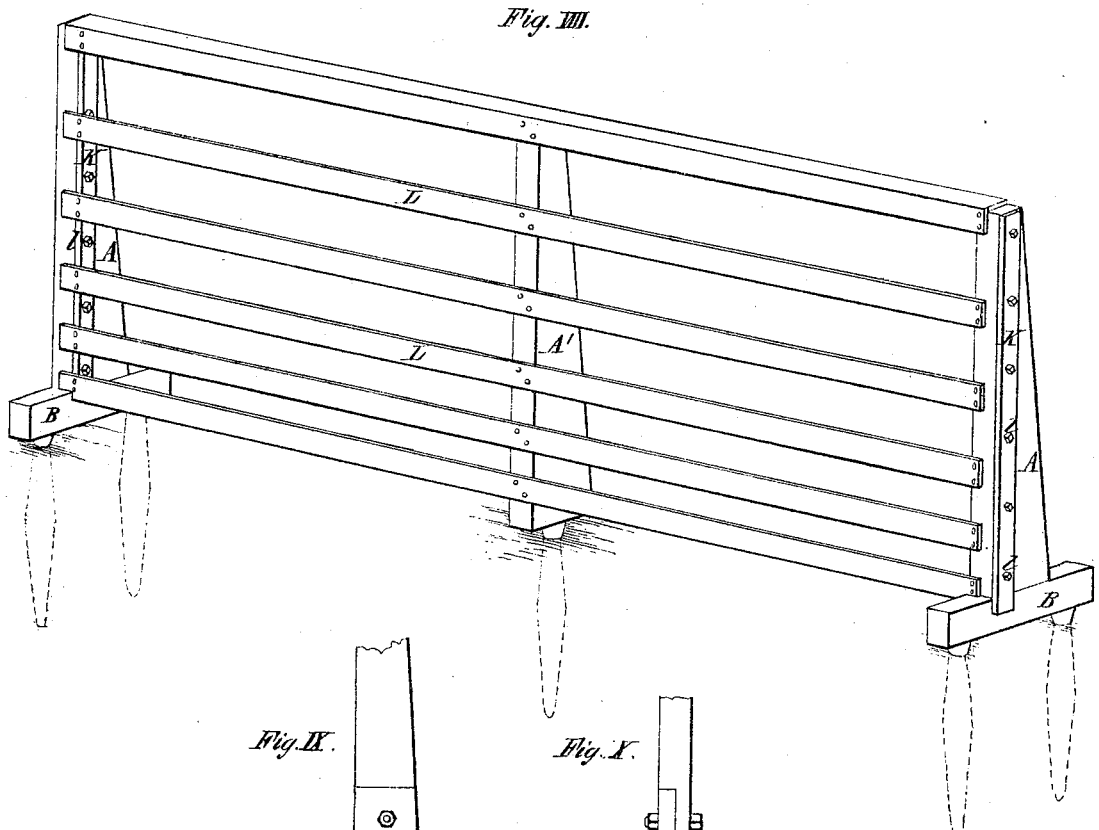

United States Patent Office.

ELLSWORTH ELY, OF LOCKPORT, NEW YORK.

Letters Patent No. 114,543, dated May 9, 1871.

IMPROVEMENT IN FENCES.

The Schedule referred to in these Letters Patent and making part of the same.

I, ELLSWORTH ELY, of Lockport, in the county of Niagara and State of New York, have invented certain Improvements in Fences, of which the following is a specification.

My invention consists—

First, in the arrangement, in a fence and with the stakes hereinafter described, of the panels, composed of two posts, boards, or rails, and a cross-stay piece, the panels being connected together by bolts so as to enable them to be readily detached and the fence made portable, as hereinafter more fully described.

Second, of a stake or lower portion of a fence-post, provided with an enlargement at its center which serves to counteract the tendency of the frost to raise and loosen the post.

In the accompanying drawing, consisting of two sheets—

Sheet I—

Figure I is an elevation of my improved fence-post;

Figure II is an elevation of one of the stakes at right angles to Fig. I;

Figure III is a cross-section of the stake on line $x\,x$;

Figure IV is a cross-section thereof on line $y\,y$;

Figure V is an elevation of an iron bridge-piece;

Figure VI is a sectional elevation; and

Figure VII, a plan view thereof.

Sheet II—

Figure VIII is a perspective view of a section of fence provided with my improvements.

Figures IX and X are elevations of a wooden stake.

Like letters designate like parts in each of the figures.

A represents the upright, to which the rails or boards are attached.

It is secured at its lower end to a cross-piece, B, resting on and fastened to two stakes, C C, driven into the ground.

The latter are of cast-iron, formed with an enlargement, $c$, at the center, and tapering toward both ends, as represented in Fig. II.

The sharp edges of the lower portion of the stake are drawn out into flat sides in the upper portion, as represented at $b$, Fig. III, to increase the hold of the stake in the ground.

The upper portion of the stake terminates in a flange, $d$, provided with a hole for the passage of a fastening-screw, $e$, into the cross-piece B.

D in Figs. IX and X represents a wooden stake constructed according to the same principle; it is made largest at the center, as shown at $b'$, and may be attached directly to the upright by a screw-bolt or otherwise.

The object of forming the stake as hereinbefore described is as follows:

The form of the stake enables the same to be easily driven into the ground, which settles around the same, or may be stamped in after it has been driven. The ground above the enlarged portion $c$ of the stake opposes considerable resistance to any force which tends to raise the stake. The action of frost is in this manner counteracted, as the earth surrounding the upper portion of the stake only is elevated by the frost, while the stake is held by the solid earth above the enlargement and below the line of the frost.

In Figs. V, VI, and VII is represented an iron bridge-piece, which may be used in place of the wooden cross-base piece B.

This bridge-piece consists of a plate, E, which is provided with a longitudinal slot, $f$, for the reception of the lower end of the upright A, and is cast with an upwardly-projecting plate, F, to which the upright is fastened.

The bridge-piece is secured to the stakes C C by bolts $h$ passing through slots $h'$ formed in plate E, or in any other suitable manner.

Each panel of the fence is composed of the boards L L, which are rigidly fastened at one end to an upright, A, at the center to an upright, A', while the opposite ends are fastened to a cross stay-piece, K.

This stay-piece of each panel is bolted or fastened by screws $l$ to the post A of the adjacent panel, thereby forming a firm continuous fence.

By disconnecting these stay-pieces K from the uprights and detaching the uprights from their stakes each panel becomes removable, thus rendering the fence portable.

In ordinary cases a single stake only will be required for the center post A' of each panel, as shown in Fig. VII.

I claim as my invention—

1. The arrangement, in a fence and with the stakes C, of the panels composed of the uprights A A', boards L, and cross stay-piece K, the panels being connected together by bolts $l$, as described, for the purpose hereinbefore set forth.

2. The stake or lower portion C of a fence-post, provided with an enlargement, $c$, at its center, as described, and for the purpose hereinbefore set forth.

ELLSWORTH ELY.

Witnesses:
EDWARD WILHELM,
JNO. J. BONNER.